(12) United States Patent
Palmer, Sr.

(10) Patent No.: US 11,346,533 B2
(45) Date of Patent: May 31, 2022

(54) VEHICLE LIGHT SYSTEM

(71) Applicant: Gregory Emerson Palmer, Sr., Palmdale, CA (US)

(72) Inventor: Gregory Emerson Palmer, Sr., Palmdale, CA (US)

(*) Notice: Subject to any disclaimer, the term of this patent is extended or adjusted under 35 U.S.C. 154(b) by 0 days.

(21) Appl. No.: 17/165,418

(22) Filed: Feb. 2, 2021

(65) Prior Publication Data
US 2022/0128224 A1   Apr. 28, 2022

Related U.S. Application Data

(60) Provisional application No. 63/104,153, filed on Oct. 22, 2020.

(51) Int. Cl.
*F21V 21/00* (2006.01)
*F21V 21/096* (2006.01)
(Continued)

(52) U.S. Cl.
CPC .......... *F21V 21/096* (2013.01); *B60Q 1/0023* (2013.01); *B60Q 1/2661* (2013.01); *B63B 45/06* (2013.01); *B63B 45/08* (2013.01); *F21S 9/037* (2013.01); *F21S 43/14* (2018.01); *F21S 45/50* (2018.01); *F21V 23/0435* (2013.01); *B60Q 2400/20* (2013.01); *F21W 2103/30* (2018.01); *F21W 2107/10* (2018.01); *F21W 2107/20* (2018.01); *F21Y 2115/10* (2016.08); *H04W 4/80* (2018.02)

(58) Field of Classification Search
CPC .. B60Q 1/0088; B60Q 1/2615; B60Q 1/2696; B60Q 1/2661; B60Q 1/0023; B60Q 5/00; F21S 45/50; F21V 21/096; F21V 21/08; F21V 23/0407
See application file for complete search history.

(56) References Cited

U.S. PATENT DOCUMENTS 6,465,962 B1 * 10/2002 Fu ........................... H05B 47/11
362/464
8,816,840 B1 * 8/2014 Peterson .................. B60Q 1/38
340/508

(Continued)

OTHER PUBLICATIONS

A Comparative Analysis Between the Performances of Monocrystalline, Polycrystalline and Amorphous Thin Film in Different Temperatures at Different Locations in Egypt (Year: 2014).*

(Continued)

*Primary Examiner* — Gerald J Sufleta, II
(74) *Attorney, Agent, or Firm* — Brennan, Manna & Diamond, LLC (57) ABSTRACT

The present invention relates generally to the field of vehicle lights. More specifically, the present invention relates to a multipurpose vehicle light that can be removably attached to an external surface of a vehicle or vessel. The device is solar or battery powered, does not rely on the vehicle's power source to operate, and can be removably attached to a vehicle exterior without damaging or permanently modifying the exterior. The device is further comprised of a USB port and a charging case to recharge the device, a light source comprised of a plurality of LEDs that may be remote controlled or automatically activated, a camera and a speaker.

9 Claims, 4 Drawing Sheets

(51) Int. Cl.
  *B60Q 1/26* (2006.01)
  *B63B 45/06* (2006.01)
  *B63B 45/08* (2006.01)
  *F21S 9/03* (2006.01)
  *F21V 23/04* (2006.01)
  *F21S 43/14* (2018.01)
  *F21S 45/50* (2018.01)
  *B60Q 1/00* (2006.01)
  *H04W 4/80* (2018.01)
  *F21W 107/20* (2018.01)
  *F21W 107/10* (2018.01)
  *F21W 103/30* (2018.01)
  *F21Y 115/10* (2016.01)

(56) References Cited

U.S. PATENT DOCUMENTS

| | | | | |
|---|---|---|---|---|
| 2010/0048329 | A1* | 2/2010 | Shwartz | A63B 57/353 473/406 |
| 2010/0271802 | A1* | 10/2010 | Recker | H05B 45/12 362/20 |
| 2011/0175719 | A1* | 7/2011 | Ford | B60Q 1/46 340/471 |
| 2011/0249430 | A1* | 10/2011 | Stamatatos | B60Q 1/52 362/184 |
| 2012/0119900 | A1* | 5/2012 | Walther | B60Q 1/268 340/474 |
| 2015/0054422 | A1* | 2/2015 | Koo | H05B 45/20 315/250 |
| 2016/0023588 | A1* | 1/2016 | Peterson | B60Q 1/441 315/77 |
| 2016/0231740 | A1* | 8/2016 | Solow | H05B 47/19 |
| 2018/0128438 | A1* | 5/2018 | Sreshta | H02J 7/35 |
| 2019/0068845 | A1* | 2/2019 | Krishnan | B60Q 1/323 |
| 2019/0253670 | A1* | 8/2019 | Chien | H04N 5/2256 |
| 2019/0359118 | A1* | 11/2019 | Spenner | B60Q 1/1423 |
| 2019/0389369 | A1* | 12/2019 | Matovich | H05B 45/10 |
| 2020/0086786 | A1* | 3/2020 | Mackey | B60Q 1/05 |
| 2020/0171998 | A1* | 6/2020 | Kondo | B60Q 1/0023 |
| 2020/0269751 | A1* | 8/2020 | Tatara | B60J 5/04 |
| 2020/0307447 | A1* | 10/2020 | Cobb | B60Q 1/52 |
| 2020/0346582 | A1* | 11/2020 | Lang | H04N 5/22521 |
| 2021/0023985 | A1* | 1/2021 | Stadnyk | B60Q 1/2661 |
| 2021/0101539 | A1* | 4/2021 | Krishnan | E05F 15/73 |

OTHER PUBLICATIONS

"Bus Truck Vehicle Backup Cameras Wide View Angle cab cam Rearview Reverse Waterproof Night Vision 4 Pin Camera for Travel Trailer/Pickup/Van/Oversize Truck/Fifth Wheel/RV Camper/Motor Home (12-24V)" (Year: 2017).*

* cited by examiner

VEHICLE LIGHT SYSTEM

CROSS-REFERENCE TO RELATED APPLICATION

The present application claims priority to, and the benefit of, U.S. Provisional Application No. 63/104,153, which was filed on Oct. 22, 2020 and is incorporated herein by reference in its entirety.

FIELD OF THE INVENTION

The present invention relates generally to the field of vehicle lights. More specifically, the present invention relates to a multipurpose vehicle light that can be removably attached to an external surface of a vehicle or marine vessel, such that the vehicle/vessel is illuminated at all times. The multipurpose vehicle light is preferably solar powered and is comprised of a solar panel which absorbs solar energy and converts the same into electrical energy, and a magnetic base that is further comprised of a rubber protective covering that allows the light system to be removably attached to a vehicle exterior without damaging or permanently modifying the exterior. The multipurpose vehicle light may be further comprised of a USB port and a charging case to recharge the light system, as well as a plurality of LEDs that may be remotely controlled or automatically activated. Accordingly, the present disclosure makes specific reference thereto. Nonetheless, it is to be appreciated that aspects of the present invention are also equally applicable to other like applications, devices and methods of manufacture.

BACKGROUND OF THE INVENTION

Existing vehicle lights require electrical power to illuminate, wherein said power is typically derived from the vehicle. However, said vehicle lights may require that the vehicle engine be turned on, or that the vehicle has an active battery to allow the lights to receive power. Unfortunately, it is not uncommon for vehicle lights to lose power if the vehicle engine isn't on or if the battery is drained or dead. In such circumstances, the loss of the vehicle lights may become an unsafe road hazard by virtue of the vehicle failing to be able to be identified or seen due to the lack of illumination. In turn, this hazard also causes a threat to the safety of the occupants of the vehicle without lights, and to those in other vehicles, which may collide with the vehicle without illumination if it is not seen.

In addition, marine vessels lost or stranded at sea may also lack the electrical power to illuminate the vessel's light system to identify their location. It has also been observed that at times drivers may forget to turn on manual headlights during lowlight hours or inclement weather. In all such circumstances, it may be difficult to identify the vehicle or vessel due to the lack of proper illumination. Further, external lights for vehicle/marine vessels cannot often be easily removed and swapped from vehicle to vehicle or vessel to vessel. In fact, such external lights are oftentimes fixedly attached to the vehicle or vessel in a manner which would be very labor-intensive to remove, and which would require permanent or semi-permanent modification of the vehicle or vessel's exterior.

Additionally, existing vehicle and vessel lights are dependent on the electrical power provided by the vehicle or vessel which, as noted above, poses a limitation on the use of standard lights in the event of vehicle electrical or mechanical failure. Further, existing external lights used with vehicles and vessels require the use of wires, connectors, harnesses and the like, that are not easily removed and/or affixed to another vehicle or vessel in the event of failure on the first vehicle or vessel.

Therefore, there exists a long felt need in the art for a multipurpose vehicle light device that does not depend on electrical power provided by a vehicle to which it is attached for illumination. There is also a long felt need in the art for a multipurpose vehicle light device that does not involve any electrical connections with the vehicle electronic circuitry, such that the same can easily be swapped from vehicle to vehicle (or vessel to vessel) without causing damage to the exterior/paint of the vehicle and that does not require significant, permanent and/or labor-intensive modifications to the vehicle or vessel body. Moreover, there is also a long felt need in the art for a multipurpose vehicle light device that is capable of capturing solar energy and converting the same into electrical energy for illuminating the lights. Additionally, there is a long felt need in the art for a multipurpose vehicle light device that may be operated remotely by the user, has multiple modes of operation and that adds to the overall aesthetics of the vehicle to which it is attached. Finally, there is a long felt need in the art for a solar powered multipurpose vehicle light device that is relatively inexpensive to manufacture and that is both safe and easy to use.

The subject matter disclosed and claimed herein, in one embodiment thereof, comprises a solar powered LED multipurpose vehicle light. The multipurpose vehicle light may be used to illuminate and identify a vehicle, such as an automobile or marine vessel, and is comprised of a silicone-based solar panel which harnesses solar energy to power an LED light source. The solar panel is also preferably comprised of a magnetic base that may be further comprised of a rubber layer to allow the device to mount to the external surface of a vehicle without damaging the exterior or paint. The multipurpose vehicle light device may also be comprised of one or more rechargeable lithium batteries that store the solar power converted to electrical energy to power the LED light sources, a USB port, a charging case to recharge the illumination device when not mounted to the vehicle or otherwise not in use, and a wireless communication module to allow a user to remotely and wirelessly operate the illumination device as needed.

In this manner, the multipurpose vehicle light system of the present invention accomplishes all of the forgoing objectives, and provides a safe, easy, convenient and cost-effective solution to illuminating a vehicle that is not reliant upon the vehicle's power source or battery. The multipurpose vehicle light system is also user friendly, less expensive than alternatives known in the art, does not require the user to put much effort or labor into attaching/removing the system to/from the vehicle, and does not damage the aesthetic appeal or exterior paint of the vehicle or require permanent modifications to be made to the vehicle to mount the system thereto.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a multipurpose vehicle lighting device. The lighting device allows a user to alert other vehicles and pedestrians of the presence of the vehicle, and is comprised of a top surface that supports a solar panel that absorbs solar energy and converts the absorbed solar energy into electrical energy to power the lighting device. The bottom surface of the lighting device is further comprised of a magnetic base having a rubber protective element to permit the lighting device to be removably attached to a vehicle's exterior surface without damaging the same. The lighting device is further comprised of one or more lighting sources positioned between the top and bottom surfaces, and one or more rechargeable batteries that store the converted electrical energy until the same is needed to power the lighting device. In addition, the lighting device may be comprised of a plurality of LED lights having one or more colors, a USB charging port to manually charge the rechargeable batteries, a wireless communication module to communicate wirelessly to a remote control, and a light sensor that automatically turns the lighting device on when a sufficient amount of ambient light is not detected.

In a further embodiment of the present invention, a self-sufficient vehicle illumination system is disclosed. The illumination system is comprised of a multipurpose vehicle light device, a magnetic bottom surface having a rubber coating, a top surface having a monocrystalline solar panel disposed thereon, a closed housing between the top surface and the bottom surface comprising a light source that illuminates the periphery of the closed housing using the absorbed solar energy gathered from the monocrystalline solar panel, a rechargeable battery to store the gathered solar/electrical energy until needed, a USB charging port to recharge the rechargeable batteries as needed (e.g., if solar energy is not readily available), a wireless communication module for allowing a user to remotely control the illumination system, and a light sensor that automatically turns on the plurality of LED lights when ambient light is not detected in sufficient quantities.

In yet a further embodiment of the present invention, a multipurpose vehicle light device for use with a vehicle and/or vessel is disclosed. The multipurpose light device is self-sufficient, and does not rely upon the vehicle or vessel's existing power supply for power. The multipurpose light device can be detachably mounted on the exterior surface of the vehicle/vessel, and is comprised of a housing and a solar panel positioned on top of the housing. The solar panel is comprised of a plurality of solar cells connected in a series and parallel connection, and the bottom surface of the housing is further comprised of a magnet with a rubber covering that can be used to mount the device to the vehicle. The lighting device further comprises an illuminating surface positioned between the top surface and the bottom surface of the housing, wherein the illuminating surface is comprised of an inner substrate having a light source, such as a plurality of light emitting diodes (LEDs) across the inner substrate, a USB port, one or more rechargeable batteries, a charging case to recharge the batteries, a wireless communication module to enable a user to remotely operate the lighting device, and a speaker for emitting an audible noise or sound upon demand by the user.

In a still further embodiment of the presently described invention, a multipurpose vehicle light device for providing illumination to identify a vehicle is disclosed. The multipurpose vehicle light device does not require power from the vehicle battery for power, and is comprised of a silicone based solar panel that absorbs solar light and powers an LED light source. The multipurpose vehicle light device further comprises a magnetic base made up of acrylonitrile butadiene styrene (ABS) and a rubber layer to mount the device to the external surface of a vehicle without damaging the exterior paint, one or more rechargeable lithium batteries to store the solar power converted to electrical energy to power an LED light source, a USB port and a charging case to recharge the illumination device, a wireless communication module to receive instructions wirelessly from a user, and a camera for capturing images and/or video of the immediate surroundings of the device.

In any of the potential embodiments of the device described herein, the solar powered LED illumination device may be comprised of a solar powered lithium battery and as many as 12, 16, or 24 LED lights which distinctly identify any vehicle or vessel upon which the illumination device is mounted. Because the illumination device does not rely upon power from the vehicle, the LED lights may remain active even while the vehicle is off. Further, the housing or body of the device may be comprised of a high impact-resistant, durable, waterproof IP67 material that is also relatively lightweight, anti-corrosive, and does not break down when repeatedly exposed to UV rays from the sun.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a multipurpose vehicle light device that does not depend on electrical power provided by a vehicle to which it is attached, and that does not involve any electrical connections with the vehicle's electronic circuitry, such that the same can easily be swapped from vehicle to vehicle (or vessel to vessel) without causing damage to the exterior/paint of the vehicle. There is also a long felt need in the art for a multipurpose vehicle light device that does not require significant, permanent and/or labor-intensive modifications to the vehicle or vessel body to install or remove, and that is capable of capturing solar energy and converting the same into electrical energy for illuminating the device. Additionally, there is a long felt need in the art for a multipurpose vehicle light device that may be operated remotely by the user, has multiple modes of operation and that adds to the overall aesthetics of the vehicle to which it is attached. Finally, there is a long felt need in the art for a solar powered multipurpose vehicle light device that is relatively inexpensive to manufacture and that is both safe and easy to use.

The multipurpose vehicle light device of the presentation invention can be removably attached onto the surface of any vehicle such as, but not limited to, a car, truck, heavy machinery, boat, airplane, helicopter, ATV, motorcycle, dirt bike, etc. to function as a means to illuminate and identify the vehicle. The device is preferably solar powered, and therefore does not rely upon the power supply of the vehicle to power the device. Accordingly, the multipurpose vehicle light device remains fully operational even when the vehicle itself may be dead (e.g. broken down on the side of the road). Further, the multipurpose vehicle light device or a series of such devices can be attached to (and removed from) a vehicle as needed by the user, and does not require any permanent mounting modifications to be made to the vehicle body, nor does the device damage the exterior/paint of the vehicle. In a preferred embodiment, the multipurpose vehicle light device may further comprise a speaker for emitting audible sounds or messages, and a camera system for capturing photos or video of the vehicle surroundings.

Figure 1:
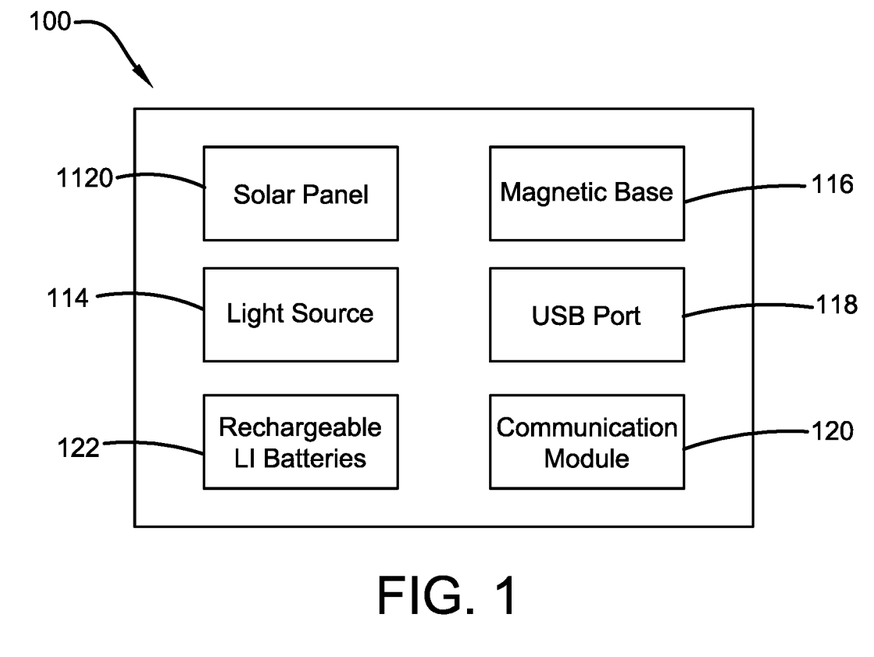
FIG. 1 illustrates a diagrammatic representation of the primary components of one potential embodiment of a multipurpose vehicle light device of the present invention for use with a vehicle or vessel in accordance with the disclosed architecture.

Referring initially to the drawings, FIG. 1 illustrates a diagrammatic representation of the primary components of one potential embodiment of a multipurpose vehicle light device 100 of the present invention for use with a vehicle 10 or vessel in accordance with the disclosed architecture. More specifically, the multipurpose vehicle light device 100 is preferably comprised of a body or housing 110, a solar panel 112, at least one light source 114, a base 116, a USB port 118, a communication module 120, at least one battery 122, a speaker 124, a camera 126, a memory 128 and a processor 129.

Figure 2:
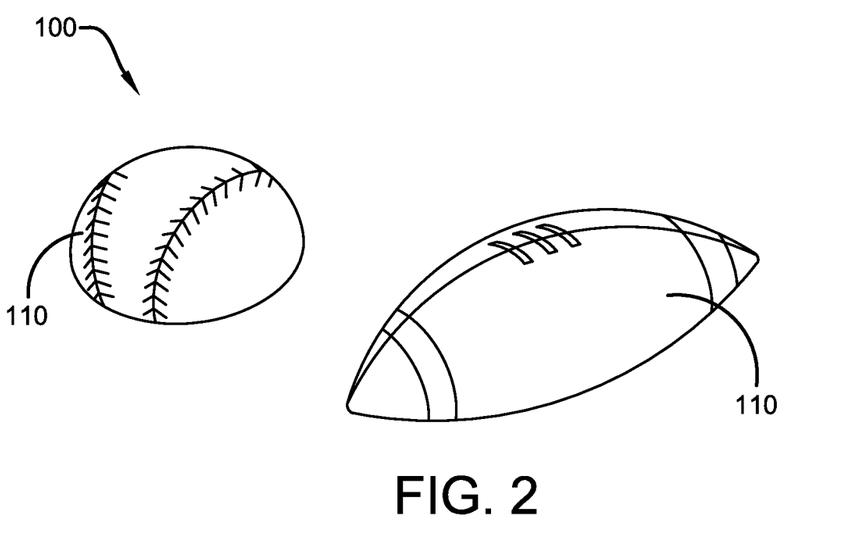
FIG. 2 illustrates a perspective view of different potential embodiments of the housing of the multipurpose vehicle light device of the present invention in accordance with the disclosed architecture.

The housing 110 further comprises a top surface 112 upon which the solar panel 112 is attached, and houses or protects the communication module 120, at least one battery 122, speaker 124, camera 126, memory 128 and processor 129 from the elements, such as rain, snow, sleet, wind, etc. The housing 110 is preferably generally oval-shaped and comprised of a relatively lightweight, high impact-resistant, durable, and waterproof body that may be comprised of IP67 material or other similar material. It is also contemplated that the housing 110 may be comprised of an anti-corrosive and UV light resistant material, film, or covering. Notwithstanding, the housing 110 may be comprised of any suitable shape and size including, but not limited to, rectangular, cubic, pyramidal, cylindrical, spherical, or any other shape. In addition, the housing 110 may take on a promotional shape to coincide with a marketing, entertainment, or sporting event, as best seen in FIG. 2. More specifically, FIG. 2 illustrates a perspective view of two different potential embodiments of the housing 110 of the multipurpose vehicle light device 100 of the present invention in accordance with the disclosed architecture, namely in the shape of a football and a baseball.

Figure 3A:
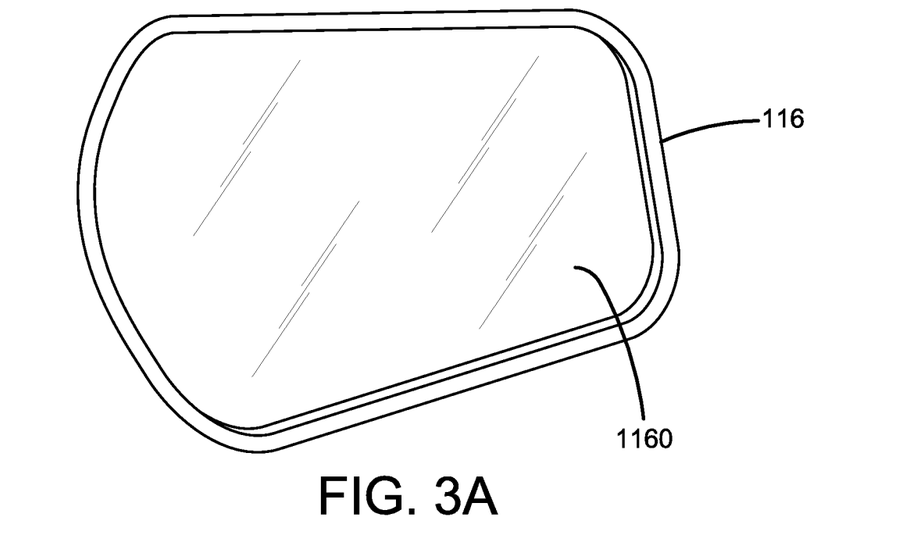
FIG. 3A illustrates a perspective view of one potential embodiment of the bottom surface of the multipurpose vehicle light device of the present invention in accordance with the disclosed architecture.

The housing 110 is attached to the base 116, which is preferably magnetic with a protective rubber element 1160 as best shown in FIG. 3A. More specifically, FIG. 3A illustrates a perspective view of one potential embodiment of the bottom surface of the multipurpose vehicle light device 100 comprising the base 116 and the rubber element 1160. The base 116 is preferably magnetic/magnetized to allow the device 100 to be detachably mounted onto the exterior of a vehicle 10 (as will be discussed more fully below) without the need for screws, clamps, or other external fasteners that would require permanent modification of the vehicle 10. The magnetic base 116 preferably has a strong grip or attraction to the exterior surface of the vehicle 10, such that the device 100 always remains fixed upon the surface and does not move or dislodge while the vehicle 10 is in motion. In one embodiment of the device 100, the base 116 may be comprised of one or a plurality of sintered neodymium channel magnets with magnetism direction along the axis of the magnet from the north to the south poles. In another embodiment, the device 100 may be comprised of one or a plurality of rubber coated neodymium magnets that may be used to form the bottom surface of the base 116. Nonetheless, and regardless of the particular embodiment selected, the magnet selected should exhibit corrosion resistance, heat resistance, and durability and the same will be subjected to both extreme temperature changes and the elements (e.g., wind, rain, snow, sleet and the like).

Further, as noted above, the bottom surface of the magnetic base 116 is preferably comprised of a protective rubber surface 1160 which prevents damage to a vehicle's exterior/paint that could occur while detaching/attaching the device 100 from the external surface of the vehicle 10. This rubber surface 1160 is preferably comprised of an isoprene rubber coating that is high in magnetic strength, weatherproof, and is ideal for outdoor applications. However, differing embodiments of the device 100 may also comprise a plurality of rubber types/styles that may take the form of a coating, film, covering, or adhesively attached member.

Figure 3B:
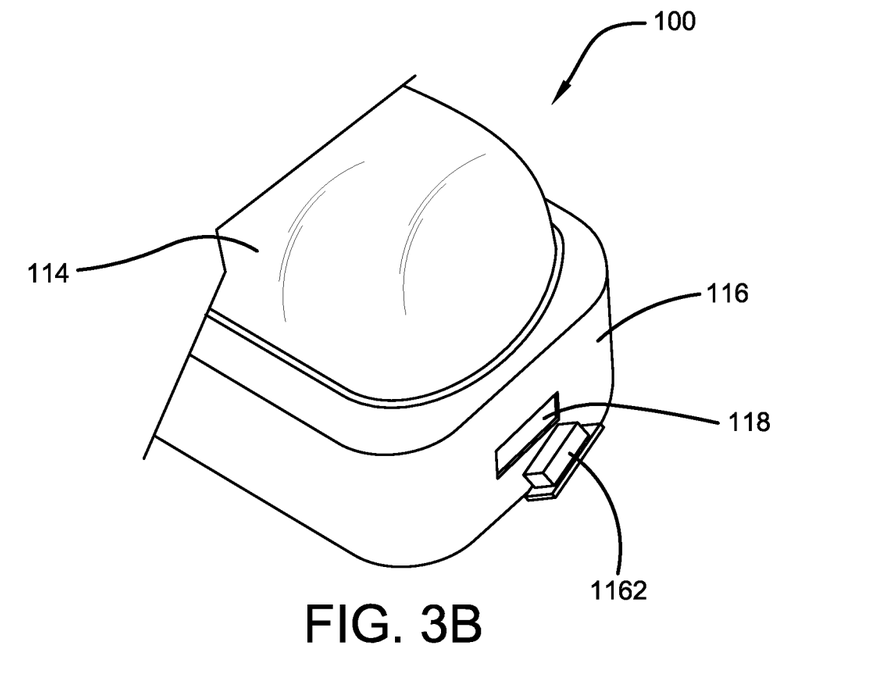
FIG. 3B illustrates an enhanced and perspective view of one potential embodiment of a USB port of the multipurpose vehicle light device of the present invention in accordance with the disclosed architecture.

FIG. 3B illustrates an enhanced and perspective view of one potential embodiment of a USB port 118 of the multipurpose vehicle light device 100 of the present invention in accordance with the disclosed architecture. The USB or mini-USB port 118 may be used to manually charge the batteries 122 of the device 100 when sufficient quantities of solar energy are not available, as described more fully below. More specifically, the device 100 can be charged using a durable, tangle-free, nylon charging cable (not shown) by removing the protective cover 1162 and plugging the cable into the USB port 118. The USB port 118 is further comprised of an internal connection to a battery charging circuit (not shown) which charges the rechargeable batteries 122 which are then used to power the devices 100. In a preferred embodiment of the device 100, the USB port 118 is comprised of a USB port that may include, but is not limited to, a USB-A, USB-B, Micro-B, Micro-USB, Mini-USB, USB-C. In a differing embodiment, the port 118 may also or alternatively be comprised of a 9v or 12v power outlet (not shown).

The USB port 118 is also useful for allowing a user to transfer to, or retrieve from, various files from the memory 128 of the device. For example, such files may include audio files or clips that the user wishes to play through the speaker 124, and/or photographs/video files captured by the camera 126 that the user wishes to retrieve, for example, to share with law enforcement if the same relate to a crime or other incident captured by the camera 126. Said camera 126 is positioned within the housing 110, but is capable of capturing images outside of the housing 110. The camera 126 may be a high-resolution camera having infrared night vision, high resolution video and wide-angle lenses. In one embodiment, the camera 126 may also be connected to a motion sensor, such that the camera 126 gets activated upon detection of any motion. The camera 126 may also be used for 24/7 live recording of the vehicle 10 and its surroundings.

The device 100 may also be provided with a charging case/adaptor (not shown) that can be used to recharge the batteries 122 using the USB or mini-USB charging port 118 wherein the device 100 can be placed into the case when not in use for convenient storage and/or transport. Once the rechargeable batteries 122 are completely charged, the device 100 is preferably able to function for more than 80 hours. In one embodiment of the device 100, the batteries 122 may be comprised of a 3.2V 600 mAh lithium battery. Alternatively, the batteries 122 may comprise a 3.2V 1000 mAh lithium battery or any similar battery type or voltage known in the art. For example, the battery 122 may be a disposable battery or a rechargeable battery, and may be easily replaced or removed if necessary. Suitable batteries 122 include alkaline, nickel-cadmium, nickel-metal hydride, etc. Throughout this specification the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used.

Figure 4:
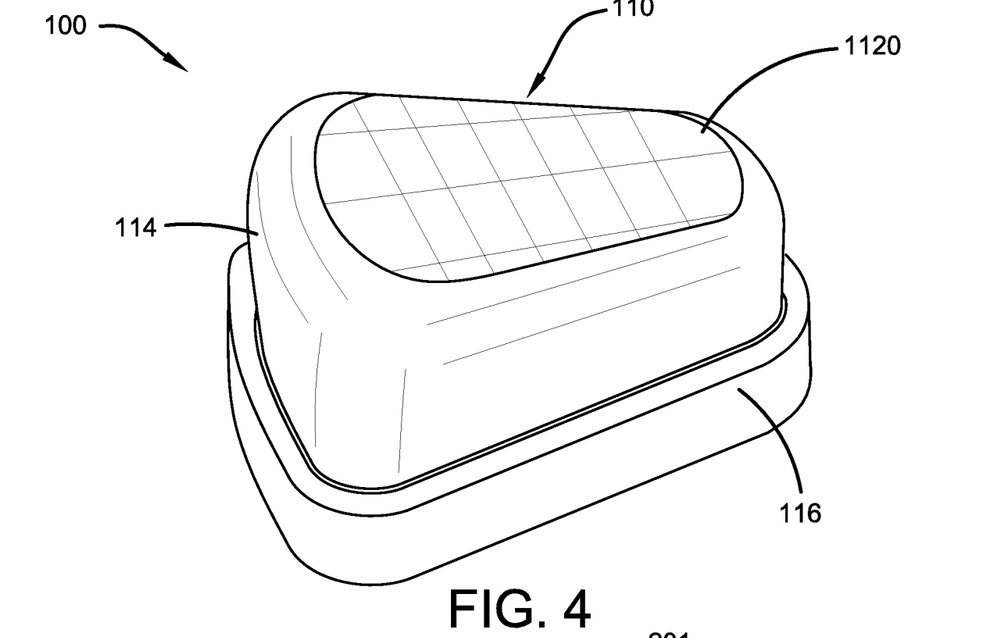
FIG. 4 illustrates a perspective view of one potential embodiment of the multipurpose vehicle light device of the present invention in accordance with the disclosed architecture, wherein a solar panel is positioned on the top surface of the housing.

FIG. 4 illustrates a perspective view of one potential embodiment of the multipurpose vehicle light device 100 of the present invention in accordance with the disclosed architecture, wherein the solar panel 1120 is positioned on the top surface 110 of the housing 100. More specifically, the solar panel 1120 absorbs sunlight and converts the same into electricity through a photovoltaic effect of the solar cells contained therein. The solar panel 1120 is comprised of a planar surface to increase the area of solar energy absorption, wherein the surface is further comprised of a plurality of solar cells (not shown) connected in a circuit (not shown) that produces the electrical energy. In differing embodiments of the device 100, the solar panel 1120 may be comprised of, but is not limited to: monocrystalline silicon, polycrystalline silicon, or a thin-film. The electrical energy produced by the solar panel 1120 is then stored in the batteries 122.

As noted above, the vehicle light device 100 further comprises a plurality of LEDs or other surface lights 114 positioned on or within the housing 110 for illuminating the device 100 and the vehicle 10. The lights 114 may be comprised of, but are not limited to, as many as 12, 16, or 24 LEDs of a single color or multiple colors. The lights 114 are powered by the batteries 122 and are preferably controllable via a remote control 200, as described more fully below. The color of the lights 114 may further vary in the style of illumination, such as a blinking or a static illumination. In the preferred embodiment, the lights 114 are illuminated constantly (e.g. during both the day and night), and irrespective of whether the vehicle is on or off. A user can then manually turn off the lights 114 using the remote 200, or an optional external power button (not shown) that may comprise a portion of the housing 116 or otherwise be positioned in the cabin of the vehicle. Alternatively, the device 100 may be comprised of a light sensor (not shown) that senses the ambient day light and turns on the light source 114 when no ambient light or an insufficient amount of ambient light is detected.

To enable a user to control the multipurpose vehicle light device 100 remotely, such as from within the vehicle 10, a wireless communication module 120 is also located within the housing 110 along with the processor 129. More specifically, the processor 129 serves as the central command of the device 100, and the wireless communication module 120 is used to send and receive commands from a user via, for example, a smart device (e.g., phone, tablet, smart watch, etc.) or a remote control 200. In a preferred embodiment of the device 100, the wireless communication module 120 is comprised of a wireless communication technology such as, but not limited to, RFID, Infrared, Wi-Fi, NFC, Bluetooth or the like, and may be used to establish a connection between the wireless communication module 120 and/or processor 129 of the device 100 and the remote control 200, as described more fully below.

Figure 5:
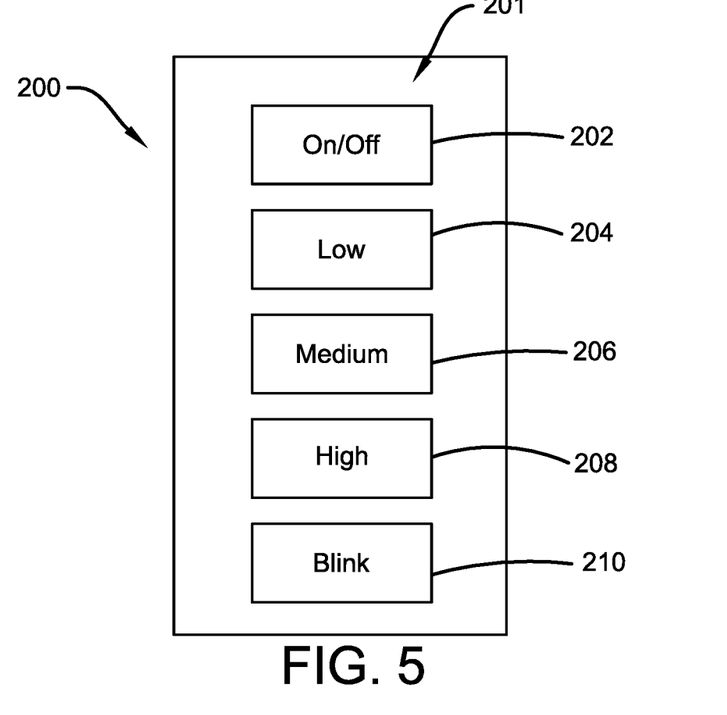
FIG. 5 illustrates a diagrammatic representation of one potential embodiment of a remote control for remotely and wirelessly operating the multipurpose vehicle light device of the present invention in accordance with the disclosed architecture.

FIG. 5 illustrates a diagrammatic representation of one potential embodiment of a remote control 200 for remotely and wirelessly operating the multipurpose vehicle light device 100 of the present invention in accordance with the disclosed architecture. More specifically, the remote control 200 is preferably comprised of a plurality of physical or touch based control buttons 201 that can be used to control the operation of the device 100. Said buttons 201 may include, but are not limited to, an on/off control button 202 which switches the device 100 on or off, control buttons 204, 206, 208 for controlling the intensity of the lights 114, a blink control button 210 for controlling the intermittent blinking of the lights 114, a camera button 212 for operating the camera 126, a speaker button 214 for operating the speaker 124, etc. Further, the remote control 200 may also allow a user to program specific patterns, colors, and timing (e.g. to coincide with the beat of music) of the lights 114.

Notwithstanding, it should be appreciated that any number of control buttons 201 may be included on the remote control 200 to increase the functionality of the device 100. Further, in one embodiment of the device 100, a smart electronic device (not shown), such as a smartphone, a PDA, a tablet or any other similar device, may also act as a remote device 200 via a wireless connection using, for example, NFC, Infrared, Bluetooth, Wi-Fi, Cellular date, etc. In yet a further embodiment of the invention, the remote control 200 may be activated and utilized by voice command.

Figure 6A:
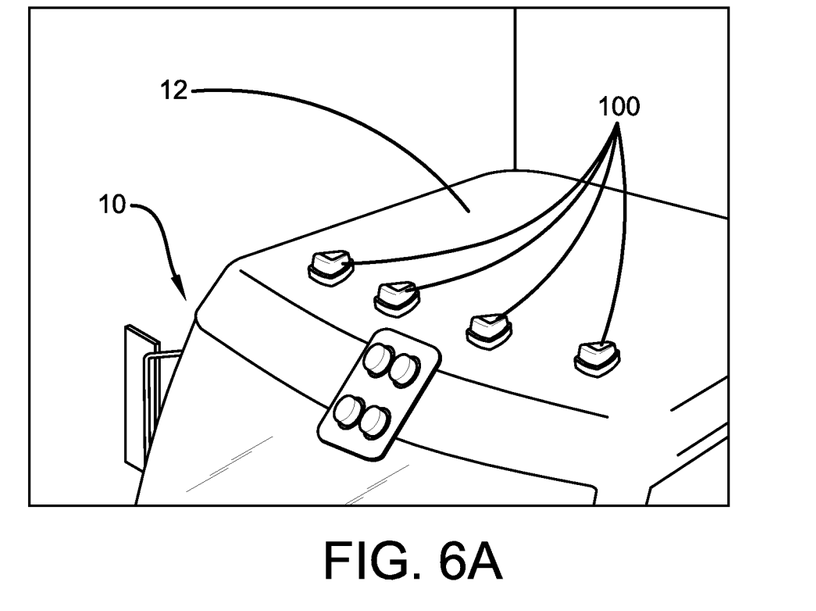
FIG. 6A illustrates a perspective view of a plurality of multipurpose vehicle light devices of the present invention attached to a vehicle roof in accordance with the disclosed architecture.
Figure 6B:
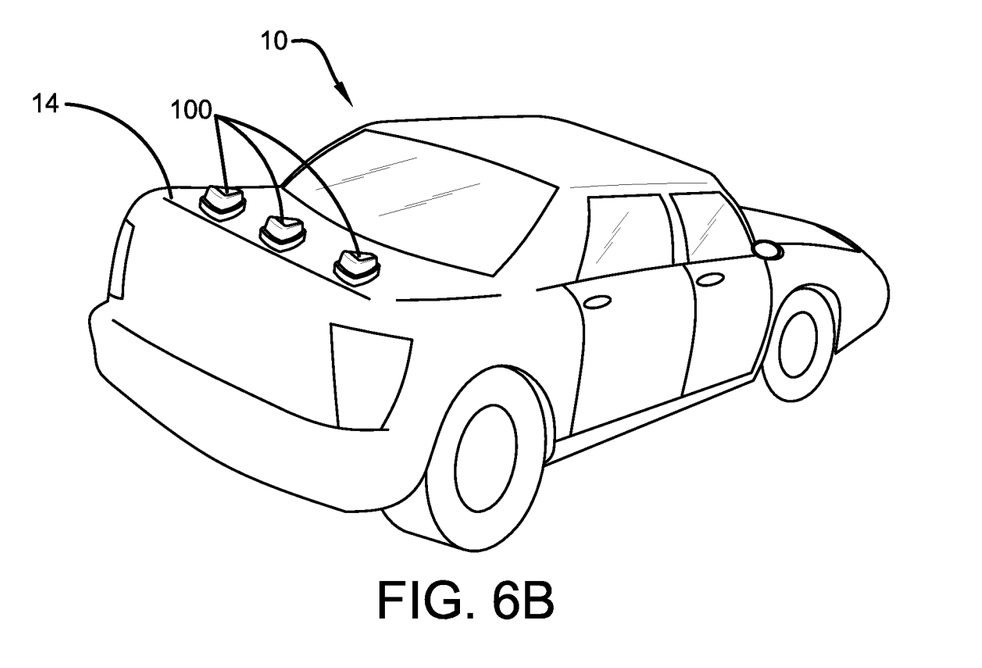
FIG. 6B illustrates a perspective view of a plurality of multipurpose vehicle light devices of the present invention attached to a vehicle trunk in accordance with the disclosed architecture.

FIG. 6A illustrates a perspective view of a plurality of multipurpose vehicle light devices 100 of the present invention attached to a vehicle roof 12 in accordance with the disclosed architecture. More specifically, the plurality of devices 100 are adhered to the roof 12 of a vehicle 10 using the magnetic base 116. The devices 100 are then used to illuminate the vehicle 10 at all times, even when the vehicle 10 is not operational. It is further contemplated that the plurality of devices 100 may be in electrical communication via a wireless technology (e.g. Wi-Fi, Bluetooth, NFC, Infrared, Cellular Data, etc.) or physical electrical wiring with one another to form a series or network of interconnected devices 100, wherein the plurality of interconnected devices 100 may be controlled with only one remote control 200. Similarly, FIG. 6B illustrates a perspective view of a plurality of multipurpose and interconnected vehicle light devices 100 of the present invention attached to a vehicle trunk 14 in accordance with the disclosed architecture.

Notwithstanding any of the forgoing, the multipurpose vehicle light system 100 of the present invention can be of any suitable size and configuration as is known in the art without affecting the overall concept of the invention, provided that it accomplishes the above stated objectives. One of ordinary skill in the art will appreciate that the size, configuration and material of the solar powered portable lighting apparatus 100 as shown in the various FIGS. are for illustrative purposes only, and that many other sizes and shapes of the solar powered portable lighting apparatus 100 are well within the scope of the present disclosure. Although the dimensions of the solar powered portable lighting apparatus 100 are important design parameters for user convenience, the solar powered portable lighting apparatus 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicle light system removably attached to an exterior of a vehicle by a magnetic base wherein the vehicle light system comprises:
   a housing integrally attached to the magnetic base, wherein the magnetic base is positioned between the housing and a magnetic strength protective isoprene rubber layer formed on the bottom of the magnetic base, wherein the magnetic base comprises a plurality of sintered neodymium channel magnets having a magnetism direction along an axis of the magnets from the north to the south poles;
   a solar panel positioned on a top surface of the housing for providing power to the vehicle light system, wherein the solar panel is diametrically opposite the magnetic strength protective isoprene rubber layer;
   a plurality of LED lights positioned between the housing and the magnetic base, wherein the plurality of LED lights emit light out of the housing;
   a battery in electrical communication with the solar panel and the plurality of LED lights;
   a wireless communication module in wireless communication with a remote control device;
   a processor and a non-transitory memory;
   a camera in communication with the memory, wherein the camera is activatable via a motion sensor attached to the housing and via the remote control device, and the camera is positioned within the housing; and
   a speaker.

2. The vehicle light system according to claim 1, wherein the wireless communication is via a select one of a Bluetooth connection, a RFID connection or a NFC connection.

3. The vehicle light system according to claim 1, wherein at least one of the plurality of LED lights has a color that is different from another one of the plurality of LED lights.

4. The vehicle light system according to claim 1, wherein the housing is comprised of an anti-corrosive and UV light resistant material.

5. The vehicle light system according to claim 1, wherein the housing is waterproof and the remote control device is a smartphone.

6. A vehicle light system configured to be removably attached to a vehicle via a magnetic base, the vehicle light system comprising:
   a waterproof housing a integrally coupled to the magnetic base, the waterproof housing comprising a top surface positioned diametrically opposite the magnetic base, and the magnetic base comprises a plurality of rubber coated magnets;
   a solar panel formed on the top surface;
   a plurality of LED lights positioned within and around the housing to emit light out of the housing;
   a rechargeable battery in electrical communication with a USB port and the solar panel;
   a speaker and a camera positioned within the housing, the camera configured to record infrared video files and store said infrared video files in a non-transitory memory; and
   a wireless communication module in wireless communication with a remote control, wherein the remote control comprises a plurality of buttons for (a) turning on/off the vehicle light system, (b) adjusting an intensity or color of the plurality of LED lights, (c) emitting a sound from the speaker, and (d) taking a photograph or video with the camera;

wherein the camera is also activatable via a motion sensor attached to the housing; and wherein the plurality of LED lights are also activatable via a light sensor attached to the housing.

7. The vehicle light system according to claim 6 further comprising a processor.

8. The vehicle light system according to claim 6, wherein at least one of the plurality of LED lights has a color that is different from another one of the plurality of LED lights.

9. The vehicle light system according to claim 6, wherein each of the sound and the photograph are stored in the non-transitory memory.

* * * * *